Patented June 21, 1938

2,121,557

UNITED STATES PATENT OFFICE 2,121,557

CEMENT AND PROCESS OF MAKING THE SAME

Malvin A. Baernstein, St. Louis, Mo., assignor to National Pigments and Chemical Company, St. Louis, Mo., a corporation of Missouri No Drawing. Application March 6, 1933, Serial No. 659,903

14 Claims. (Cl. 106—25)

This invention relates generally to cement and cement products, and particularly to Portland cement containing a small proportion of an oxy-barium compound, as well as the process of making such cement. This application is as to common subject matter a continuation of the prior copending application, Serial No. 540,005 filed May 25, 1931.

In the manufacture of cement, it is customary to burn in a kiln suitable proportions of argillaceous and calcareous materials, usually clay and limestone respectively, and in accordance with the general rules, in the proportions of one part of the former to three of the latter. Ordinarily the resultant cement contains as its principal ingredients tri-calcium-silicate, di-calcium-silicate, calcium aluminates and a solid solution generally containing some ferric oxide. It is generally recognized that the strength giving compound of a cement such as that just described, is the tri-calcium-silicate, and accordingly in those cements which it is desired to have high early strength re-burning is generally resorted to in order to increase the proportion of tri-calcium-silicate to di-calcium-silicate. For instance, in a normal Portland cement, the ratio of tri-calcium-silicate to di-calcium-silicate is ordinarily about 5 to 4, while the high early strength cements may show a ratio of 8 to 2 or 9 to 1.

The presence of water soluble salts in ordinary cements tends to produce what is known as efflorescence and laitance, which is the appearance on the surface of the cement or concrete after hydration of a chalky appearing substance which is porous and incapable of being bonded to another layer of cement or concrete.

It is among the objects of the present invention generally stated to provide a process of making cement in which the proportion of soluble and non-strength giving compounds is substantially reduced.

Another object of the invention is to provide a process of making cement in which an accelerator is employed during the burning of the mix and the tendency of which is to increase the proportion of strength given tri-calcium-silicate.

A particular object of the present invention is to provide a cement and the process of making the same in which an oxy-barium compound is present and employed.

A more specific object of the present invention is to provide a process of making cement in which a relatively small quantity of a barium containing material such, for instance, as barium ore is burned with the argillaceous and calcareous materials which ordinarily comprise a cement mix.

Other objects will become apparent to those skilled in the art when the following description is read:

In accordance with the present invention, generally stated, a cement is produced which contains an oxy-barium compound, believed to be tri-barium-aluminate, there being a relatively small proportion of the barium compound, for instance, less than 5%, and under most circumstances, it is practical to use less than 3% barium. The presence of the barium compound in the Portland cement reduces, to a great extent, the efflorescence and laitance which is ordinarily present, and particularly when there is a free lime present in the cement. Moreover, the presence of barium in the cement tends to eliminate swelling and produces a sound cement.

The oxy-barium compound may be added to the cement in any desired manner, a convenient method being to burn barium containing material such as ore along with ordinary cement forming ingredients. By this method the usual procedure practiced at cement kilns need not be varied but the barium containing material may be handled with and subjected to the same treatments as the usual ingredients of a raw cement mix regardless of whether the wet or the dry process is being employed.

In accordance with one embodiment of the present invention, a barium containing material such, for instance, as barium ore, either barytes (barium sulphate) or witherite (barium carbonate) may be burned in the desired proportions along with the ordinary cement forming ingredients. The presence of barium not only in the kiln, but also throughout the entire conventional cement making process is particularly advantageous as will more fully appear hereinafter. For instance, in the so-called wet process wherein the ingredients are ground and mixed into a slurry and filtered before charging into the kiln, the presence of barium seems to facilitate the filtering so that there is a decided increase in the available kiln load from a particular filter. This increase in the available kiln load is particularly advantageous since it is also observed that the presence of barium seems to accelerate the burning of clinkers in the kiln. From actual tests, it has been determined that the filter and kiln capacities may be safely increased as much as 10% by the employment of barium. Moreover, higher ratios of lime to silica may be burned in the presence of barium than has been heretofore possible.

As pointed out hereinbefore, the barium may be added to the mix and charged into the kiln along with the other ingredients and the barium may be in any suitable commercial form such, for instance, as barytes ore. Although it is believed most practical to regulate the proportions of barium containing material so that the resultant clinker contains between 1 and 2% of barium oxide, it will be apparent from the following description that advantageous results may be attained with various proportions of barium oxide up to, for instance, 3%. A number of typical examples are shown in the following table which indicates the proportions of the various oxides present in the clinker:

|  | I | II | III | IV | V | VI | Reg. |
|---|---|---|---|---|---|---|---|
| $SiO_2$—Cement | 20.70 | 20.58 | 20.85 | 20.29 | 20.74 | 19.80 | 21.78 |
| $Al_2O_3$ | 6.25 | 5.70 | 5.70 | 5.83 | 5.65 | 5.70 | 6.07 |
| $Fe_2O_3$ | 3.10 | 3.32 | 3.30 | 3.29 | 3.32 | 3.30 | 3.25 |
| $CaO$ | 63.10 | 63.32 | 63.05 | 63.10 | 62.88 | 63.16 | 62.60 |
| $MgO$ | 3.80 | 3.70 | 3.60 | 3.82 | 3.59 | 4.00 | 3.99 |
| $SO_3$ | 1.50 | 1.55 | 1.60 | 1.61 | 1.34 | 1.68 | 1.73 |
| $BaO$ | .97 | 1.23 | 1.33 | 1.55 | 1.94 | 1.71 |  |

The above table shows the quantity of the various oxides present in cement in six typical embodiments, each containing a different percentage of barium oxide and the relative proportions of the oxides present in the barium containing cement may be compared with the percentages shown in the column headed "Reg." which represents a normal Portland cement. It will be understood, of course, that the relative proportions of limestone, clay and barytes which constitute the raw mix may be readily determined in accordance with the usual practice after analyses of the raw materials available and in conjunction with the foregoing table.

The following table indicates the relative percentages of di-calcium-silicate and tri-calcium-silicate present in a cement resulting from each of the six examples given in the above table and also the percentages of the regular Portland cement:

|  | I | II | III | IV | V | VI | Reg. |
|---|---|---|---|---|---|---|---|
| $2CaO.SiO_2$ | 20.50 | 16.85 | 21.00 | 15.00 | 24.20 | 19.00 | 37.00 |
| $3CaO.SiO_2$ | 51.50 | 56.10 | 52.00 | 57.00 | 55.00 | 60.00 | 42.00 |

From an inspection of the above table it is evident that the ratio of tri-calcium-silicate to di-calcium-silicate of the barium containing cements far exceeds the ratio in the case of regular Portland cement.

As indicating the increased efficiency of a cement plant not only with reference to burning, but also with reference to filtering, the following data obtained from commercial test runs from two kilns, producing 2,500 barrels per day, is given:

|  | I | II | III | IV | V | VI | Reg. |
|---|---|---|---|---|---|---|---|
| Slurry ground-ft. (86.5 bbls. per ft.) | 27.0 | 26.0 | 31.7 | 30.0 | 27.5 | 28.5 | 24.0 |
| Slurry burnt-ft. (86.5 bbls. per ft.) | 27.0 | 48.0 | 30.5 | 29.0 | 28.5 | 26.0 | 26.0 |
| Filter rate #1 and 2 | 46.29 | 50.00 | 52.62 | 53.50 | 53.94 | 48.18 | 44.88 |
| Filter rate #1 and 3 | 48.70 | 53.55 | 55.04 | 52.70 | 51.35 | 51.31 | 49.20 |
| Filter speed #1 and 2 | 3.03 | 3.10 | 3.20 | 3.20 | 3.20 | 3.20 | 3.04 |
| Filter speed #1 and 3 | 2.56 | 2.58 | 2.58 | 2.58 | 2.58 | 2.58 | 3.03 |
| Total clinker bbl./hr. | 51.52 | 52.4 | 54.2 | 56.66 | 55.00 | 47.65 | 45.60 |
| Total coal lbs./bbl. | 113.12 | 112.02 | 111.10 | 109.70 | 105.26 | 120.00 | 131.63 |

From the above it will be observed that the presence of barium appears to facilitate not only the grinding, but also the burning and increases the filter speed. Moreover, the saving of fuel is quite noticeable.

As indicating the comparative early strength of cement produced in accordance with the present invention, and regular normal Portland cement, the following table is given, the examples of barium containing cement corresponding to the examples given in the foregoing table:

|  | I | II | III | IV | V | VI | Reg. |
|---|---|---|---|---|---|---|---|
| Strength—1 day | 157 | 134 | 162 | 161 | 160 | 150 | 146 |

The above figures represent the average of a seven day run on each of the six examples, the percentage of barium being changed each week. It will be observed that example II (1.23% BaO) shows considerably lower strength than the other examples but this is due to disturbed laboratory conditions incident to severe cold weather during the last five days. The runs of the first two days of example II, however, showed 1-day strengths of 155 and 168 respectively.

It is to be noted also that the fineness of the six barium examples was not so favorable for high early strength as was the fineness of the "Reg." example. The average percentage passing a 200 mesh screen appears from the following table:

|  | I | II | III | IV | V | VI | Reg. |
|---|---|---|---|---|---|---|---|
| Slurry | 92.84 | 92.40 | 91.64 | 90.90 | 90.75 | 91.60 | 93.34 |
| Cement | 91.4 | 92.3 | 93.3 | 92.9 | 91.15 | 92.9 | 91.3 |

Of course, greater fineness of both slurry and cement ordinarily increases the early strength, and the so-called "high early strength" cements are generally of such a fineness that 98% or more will pass a 200 mesh screen.

The use of barium permits an increase of the lime minus alumina to silica ratio which in the normal Portland cement produced at the plant referred to cannot exceed 2.58 to 1 without excessive free lime. It was found, however, that in the presence of barium the ratio could be increased without excessive free lime production. The ratio was increased as shown in the following table without attempting to determine the permissible maximum ratio:

|  | I | II | III | IV | V | VI | Reg. |
|---|---|---|---|---|---|---|---|
| $\dfrac{CaO-Al_2O_3}{SiO_2}$ | 2.75 | 2.80 | 2.76 | 2.82 | 2.75 | 2.90 | 2.58 |

In the so-called high early strength cements the lime minus alumina to silica ratio is usually 2.90–3.00 to 1, but it is necessary to reburn this cement, some lime being added on the second burn since it is difficult if not impossible even with the most carefully selected raw materials to obtain from a single burn normal cement having a ratio exceeding 2.75 to 1 and which is sound.

In each of the foregoing tables the examples designated as "I to VI" inclusive and "Reg." correspond, that is to say, the data of the various tables applies to the respective examples having compositions as indicated in the table first above given.

X-ray analyses of cement produced in accordance with the present invention show lines which are believed to indicate the presence of the barium in the form of tri-barium-aluminate. This is probably the case, particularly since, to an extent at least, some of the advantages of cement in which barium ore is burned in the kiln with the argillaceous and calcareous materials may be obtained by adding to ordinary Portland cement, a small proportion, for instance up to 3%, of tri-barium-aluminate. Ordinary Portland cement, having tri-barium-aluminate as an addition, shows improved weathering characteristics.

Upon hydration it appears that the soluble portion of the free lime present in cement produced in accordance with the present invention tends to combine either with the di-calcium-silicate forming strength giving tri-calcium-silicate, or else with the alumina released by the barium aluminate upon hydration, producing insoluble calcium aluminate. Tri-barium-aluminate which is believed to be present in the cement of the present invention is water soluble so that upon hydration the soluble lime and the alumina may react producing insoluble calcium aluminates. The soluble aluminate should, therefore, be present in sufficient amount to combine with the soluble portion of the free lime and the barium charge may be regulated to accomplish this. Moreover, the barium oxide released by the tri-barium-aluminate unites with the free sulphates and carbonates producing insoluble barium rather than soluble calcium salts. It is, therefore, apparent that substantially all of the soluble laitance producing ingredients are converted into insolubles either in the kiln or during hydration, and accordingly a cement is produced which does not severely weather.

From the foregoing description it is apparent that the process disclosed is capable of producing a cement in which the occurrence of efflorescence and laitance is prevented, but it may be pointed out that the process of this invention is not limited to the manufacture of cement but is adaptable as well to the prevention of efflorescence and laitance in the many allied arts, such as for instance the ceramic industry and the manufacture of plaster, and it is to be distinctly understood that the adaptation of the process hereinbefore described to such allied arts is contemplated by and within the spirit of the present invention. Furthermore it is apparent that many modifications of the process hereinbefore described will occur to those skilled in the art and that barium oxide may be used alone to attain some of the advantages of this invention, or other elements or compounds thereof than barium are capable, to some extent at least, of preventing the formation of the excess of soluble salts in cementitious products so that the use of such other materials than barium or barium compounds is within the spirit of the present invention. It is to be distinctly understood, therefore, that the process hereinbefore described is not limited to the specific details set forth but that the use thereof in other arts as well as the use of other materials than those hereinbefore disclosed is contemplated by and within the scope of the appended claims.

Having thus described the invention, what is claimed is:

1. In the art of making cement the process comprising, mixing Portland cement forming ingredients including a preponderance of calcareous material in the desired proportions, adding a small percentage of a barium compound to the mix, and burning the mix.

2. In the art of making cement the process comprising, mixing Portland cement forming ingredients including a preponderance of calcareous material in the desired proportions, adding a small percentage of a barium ore to the mix, and burning the mix.

3. In the art of making cement the process comprising, mixing Portland cement forming ingredients including a preponderance of calcareous material in the desired proportions, adding a small percentage of barium sulphate to the mix, and burning the mix.

4. In the art of making cement the process comprising, burning together Portland cement forming ingredients and a barium compound in proportions such that barium oxide will comprise less than three (3%) percent of the clinker.

5. In the art of making cement the process comprising, burning together Portland cement forming ingredients and a barium compound in proportions such that barium oxide will comprise 1% to 2% of the clinker.

6. In the art of making cement the process comprising, burning argillaceous and calcareous materials together with barium containing material in such proportions that barium comprises less than 3% of the resultant clinker.

7. A raw cement mix comprising, a preponderance of calcium bearing material and a small proportion of a barium compound.

8. A raw cement mix comprising, a preponderance of calcium bearing material and a small proportion of a barium ore.

9. A raw cement mix comprising, a preponderance of calcium bearing material and a small proportion of barium sulphate.

10. A raw cement mix comprising argillaceous and calcareous materials and barium containing material in such proportions that the barium comprises less than 3% of the mix.

11. A cement comprising barium aluminate in an amount sufficient to substantially inhibit laitance but less than 5%.

12. In the art of making cement, the process comprising, mixing raw argillaceous and calcareous materials in proportions such as to yield a lime-silica ratio exceeding the normal ratio for Portland cement formed from the particular raw materials, adding a small percentage of a barium compound to the mix, and burning the mix.

13. In the art of making cement, the process comprising, burning a Portland cement mix constituted so that the cement will have a lime-silica ratio of at least about 2.58 to 1 together with sufficient of a barium containing material to result in a cement containing an oxy-barium compound in an amount less than 3% by weight.

14. A composition of matter comprising, Portland cement and tribarium aluminate, the latter being in an amount sufficient to substantially inhibit laitance but not exceeding 3%.

MALVIN A. BAERNSTEIN.

CERTIFICATE OF CORRECTION.

Patent No. 2,121,557.　　　　　　　　　　　　　　June 21, 1938.

MALVIN A. BAERNSTEIN.

It is hereby certified that error appears in the printed specification of the above numbered patent requiring correction as follows: Page 2, first column, line 69, in the table, under the heading "II" for "48.0" read 28.0; and that the said Letters Patent should be read with this correction therein that the same may conform to the record of the case in the Patent Office.

Signed and sealed this 26th day of July, A. D. 1938.

Henry Van Arsdale,
　　　　　　　　　　　　　　　　　Acting Commissioner of Patents.

(Seal)